(12) United States Patent
Pokhrel

(10) Patent No.: US 11,948,142 B2
(45) Date of Patent: Apr. 2, 2024

(54) SYSTEMS AND METHODS FOR DISPLAYING USER-CREATED INFORMATION ON A PAYMENT DEVICE TO ASSIST A USER IN SELECTING A PAYMENT DEVICE FOR USE IN A TRANSACTION

(71) Applicant: VISA INTERNATIONAL SERVICE ASSOCIATION, San Francisco, CA (US)

(72) Inventor: Binit Pokhrel, Austin, TX (US)

(73) Assignee: Visa International Service Association, San Francisco, CA (US)

( * ) Notice: Subject to any disclaimer, the term of this patent is extended or adjusted under 35 U.S.C. 154(b) by 17 days.

(21) Appl. No.: 17/762,649

(22) PCT Filed: Nov. 7, 2019

(86) PCT No.: PCT/US2019/060244
§ 371 (c)(1),
(2) Date: Mar. 22, 2022

(87) PCT Pub. No.: WO2021/091558
PCT Pub. Date: May 14, 2021

(65) Prior Publication Data
US 2022/0343313 A1   Oct. 27, 2022

(51) Int. Cl.
*G06Q 20/40* (2012.01)
*G06F 16/28* (2019.01)
*G06Q 20/04* (2012.01)
*G06Q 20/32* (2012.01)
*G06Q 20/34* (2012.01)
*G06Q 20/36* (2012.01)
*G06Q 20/38* (2012.01)
*G06Q 50/00* (2012.01)
(Continued)

(52) U.S. Cl.
CPC ..... *G06Q 20/3274* (2013.01); *G06Q 20/3267* (2020.05); *G06Q 20/363* (2013.01)

(58) Field of Classification Search
CPC .......... G06Q 20/3274; G06Q 20/3267; G06Q 20/363; G06Q 20/3672
See application file for complete search history.

(56) References Cited

U.S. PATENT DOCUMENTS

2013/0132229 A1* 5/2013 Lynch .................. G06Q 40/00
705/26.5
2013/0290181 A1* 10/2013 Milner ................. G06Q 20/351
705/41

(Continued)

OTHER PUBLICATIONS

D. Takahashi, "This credit card has a display and a cell phone connection," Jan. 18, 2018, Venture Beat, retrieved from: https://venturebeat.com/commerce/this-credit-card-has-a-display-and-a-cell-phone-connection/ (Year: 2018).*

(Continued)

*Primary Examiner* — Daniel S Felten
*Assistant Examiner* — Douglas W Pinsky
(74) *Attorney, Agent, or Firm* — K&L Gates LLP

(57) ABSTRACT

The disclosed system and method provides a display on the representation of the electronic transaction account and the display may display information about the electronic transaction account or other data desired to be displayed by the consumer.

18 Claims, 6 Drawing Sheets

(51) Int. Cl.
*H04L 29/06* (2006.01)
*G06Q 20/10* (2012.01)

(56) References Cited

U.S. PATENT DOCUMENTS

| | | | |
|---|---|---|---|
| 2014/0040125 A1* | 2/2014 | Kunz | G06Q 40/00 |
| | | | 705/41 |
| 2014/0244514 A1 | 8/2014 | Rodriguez et al. | |
| 2016/0026994 A1 | 1/2016 | Marcus | |
| 2018/0012222 A1 | 1/2018 | Berger et al. | |
| 2018/0308141 A1* | 10/2018 | Beck | G06Q 20/347 |

OTHER PUBLICATIONS

M. Raghuwanshi, "How does web browsers work," May 18, 2017, Medium, retrieved from: https://medium.com/@monica1109/how-does-web-browsers-work-c95ad628a509 (Year: 2017).*
International Search Report and Written Opinion for corresponding International Application No. PCT/US2019/060244, dated Jan. 30, 2020, 9 pages.

* cited by examiner

SYSTEMS AND METHODS FOR DISPLAYING USER-CREATED INFORMATION ON A PAYMENT DEVICE TO ASSIST A USER IN SELECTING A PAYMENT DEVICE FOR USE IN A TRANSACTION

CROSS-REFERENCE TO RELATED APPLICATION

This application is a national phase entry of International Application No. PCT/US2019/060244, filed Nov. 7, 2019, the disclosure of which is incorporated by reference herein.

BACKGROUND

Consumers often have a plurality of electronic transaction accounts. The electronic transaction accounts often have rewards or rebates for using each card. In addition, the rewards can vary depending on a variety of factors such as but not limited to the type of purchase, the month of the year and the amount spent. Trying to remember which electronic transaction account provides which benefit is a challenge as the electronic transaction accounts often are not noted on the physical card or the representation of the electronic transaction account on an electronic device.

SUMMARY

The disclosed system and method provides a display on the representation of the electronic transaction account and the display may display information about the electronic transaction account or other data desired to be displayed by the consumer. In one embodiment, a method for displaying a graphic object on a payment device may be disclosed. At a processor of a mobile computing device, the graphic object corresponding to a payment device may be received where the graphic object is created by the holder or responsible party of the payment device. The graphic may be reviewed to determine if the graphic is in the expected format and protocol. If the graphic is in the expected protocol, the graphic object may be displayed in a display area by the processor of the mobile computing device.

BRIEF DESCRIPTION OF THE FIGS

Figure 1:
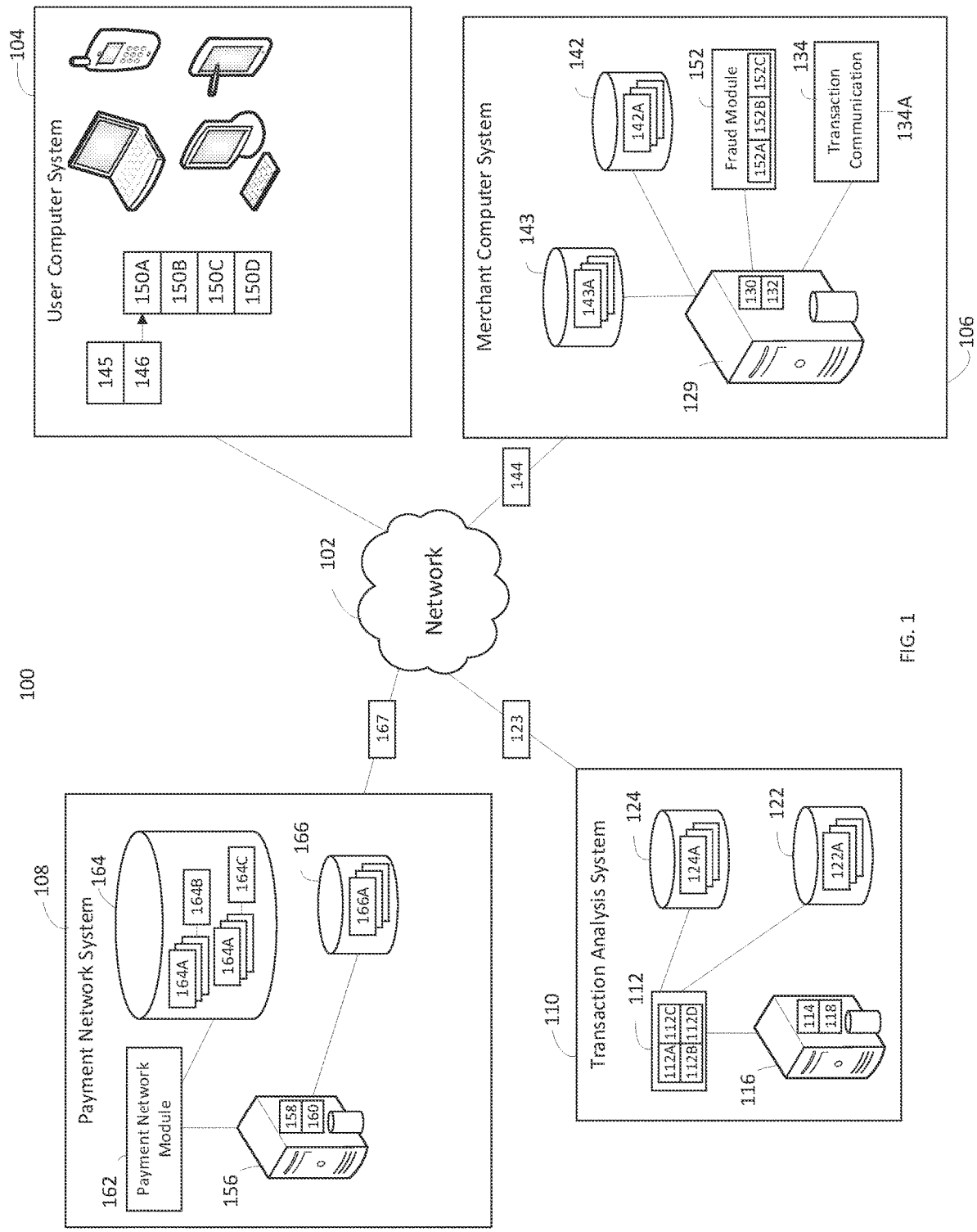
FIG. 1 illustrates a sample electronic payment system.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required.

It will also be understood that the terms and expressions used herein are to be defined with respect to their corresponding respective areas of inquiry and study except where specific meaning have otherwise been set forth herein.

Specification

The present disclosure now will be described more fully hereinafter with reference to the accompanying drawings, which form a part hereof, and which show, by way of illustration, specific exemplary embodiments by which the disclosure may be practiced. These illustrations and exemplary embodiments are presented with the understanding that the present disclosure is an exemplification and is not intended to be limited to any one of the embodiments illustrated. The disclosure may be embodied in many different forms and should not be construed as limited to the embodiments set forth herein; rather, these embodiments are provided so that this disclosure will be thorough and complete, and will fully convey the scope of the disclosure to those skilled in the art. Among other things, the present disclosure may be embodied as methods or devices. Accordingly, the present disclosure may take the form of an entirely hardware embodiment, an entirely software embodiment or an embodiment combining software and hardware aspects. The following detailed description is, therefore, not to be taken in a limiting sense.

The system 100 may include a computer network 102 that links one or more systems and computer components. In some embodiments, the system 100 includes a user computing device 104, a merchant computer system 106, a payment network system 108 and a transaction analysis system 110.

The network 102 may be described variously as a communication link, computer network, internet connection, etc. The system 100 may include various software or computer-executable instructions or components stored on tangible memories and specialized hardware components or modules that employ the software and instructions in a practical application to manage network nodes for a transaction, as described herein.

The various modules may be implemented as computer-readable storage memories containing computer-readable instructions (i.e., software) for execution by one or more processors of the system 100 within a specialized or unique computing device. The modules may perform the various tasks, steps, methods, blocks, etc., as described herein. The system 100 may also include both hardware and software applications, as well as various data communications channels for communicating data between the various specialized and unique hardware and software components.

Networks are commonly thought to comprise the interconnection and interoperation of hardware, data, and other entities. A computer network, or data network, is a digital telecommunications network that allows nodes to share resources. In computer networks, computing devices exchange data with each other using connections, e.g., data links, between nodes. Hardware networks, for example, may include clients, servers, and intermediary nodes in a graph topology (e.g., the user computer system 104, the merchant computer system 106, and the payment network system 108 and the transaction analysis system 110). In a similar fashion, data networks may include data nodes in a graph topology where each node includes related or linked information, software methods, and other data. A node such as the mobile computing device 104 may be managed to facilitate transactions with other nodes of the system (e.g., the merchant computer system) based on the data and instructions of various other nodes of the system 100.

It should be noted that the term "server" as used throughout this application refers generally to a computer, other device, program, or combination thereof that includes a processor and memory to process and respond to the requests of remote users/nodes across a communications network. Servers send their information to requesting "clients." The term "client" as used herein refers generally to a computer, program, other device, user and/or combination thereof that is capable of processing and making requests and obtaining and processing any responses from servers across a communications or data network. A computer, other device, set of related data, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The mobile computing device 104 may include a smartphone 104 or other computing device capable of sending and receiving a wireless digital communication. The mobile computing device may include a processor 145, a memory 146, and a battery. The mobile computing device 104 may include an RFID tag 104A or other device capable of sending a radio signal including mobile computing device data such as a battery charge level. The memory 146 of the mobile computing device 104 may include various modules including instructions that, when executed by the processor 145 control the functions of the mobile computing device 104 generally and integrate the mobile computing device into the system 100 in particular. For example, some modules may include an operating system 150A, a browser module 150B, a communication module 150C, and a wallet module 150D. The communication module 150C may include processor-executable instructions to send and/or receive a signal from contactless component of the system. In some embodiments, the communication module 150C may include an RFID receiver or instructions to implement an RFID receiver. The wallet module 150D may also include payment device data. The payment device data may securely identify a payment device and a user's payment account information to facilitate a transaction between the mobile computing device 104 and the merchant computer system 106. In some embodiments, the payment device data may be tokenized such that only a trusted partner may access the payment device data.

The merchant computer system 106 may include a computing device such as a merchant server 129 including a processor 130 and memory 132 including components and instruction modules including processor-executable instructions to facilitate transactions with the mobile computing device 104 via other entities of the system 100. In some embodiments, the memory 132 may include a transaction communication module 134. The transaction communication module 134 may include instructions to send merchant messages 134A to other entities (i.e., 104, 108, 110) of the system 100 to indicate a transaction has been initiated with the mobile computing device 104 generally and wallet module 150D in particular including payment account data, location data, and other data as herein described. For example, a node of the system 100 (e.g., the mobile computing device 104 generally and the browser module 150B in particular) may access a merchant website to initiate a transaction. Some examples of transactions include ticket sales for specific seats at a venue.

The merchant computer system 106 may also include a transaction repository 142 and instructions to store payment and other transaction data 142A within the transaction repository 142. The merchant computer system 106 may also include a product repository 143 and instructions to store product and other data 143A within the product repository 143. In some embodiments, the merchant computer system 106 may also include instructions to send payment device data corresponding to the payment device, transaction data 143A, and/or product data 143B and other data it received during a transaction to the payment network system from the mobile computing device 104.

The payment network system 108 may include a payment server 156 including a processor 158 and memory 160. The memory 160 may include a payment network module 162 including instructions to facilitate payment between parties (e.g., one or more users, merchants, etc.) using the system 100. The module 162 may be communicably connected to an account holder data repository 164 including payment network account data 164A. The payment network account data 164A may include any data to facilitate payment and other funds transfers between system entities (e.g., 104, 106 and 110). For example, the payment network account data 164A may include identification data, account history data, payment device data, etc. The module 162 may also include instructions to send payment messages 166 to other entities and components of the system 100 in order to complete transactions between the mobile computing system 104 and the merchant computer system 106. For example, the module 162 may include instructions to send a payment message 166 to a transaction analysis system 110 or other entity of the system 100 to complete a purchase transaction. The message 166 may include data to authorize a purchase transaction such as an authorization number or other identification, and may be tokenized or encrypted by the system 100 before the message 166 is communicated over the network 102 to a system entity.

The transaction analysis system 110 may be used to provide real time or virtual real time analysis of a merchant's risk score. A server 116 may have a memory to store computer executable instructions that may physically configure a processor 118 according to the computer executable instructions. A table of transactions 112 may store individual transactions 112A, 112B, 112C and 112D for periodic or real time analysis. The transaction data may be stored in databases 112 and 124 that may contain past entries 122A and 124A which may be used to analyze the risk of present transactions.

Figure 2:
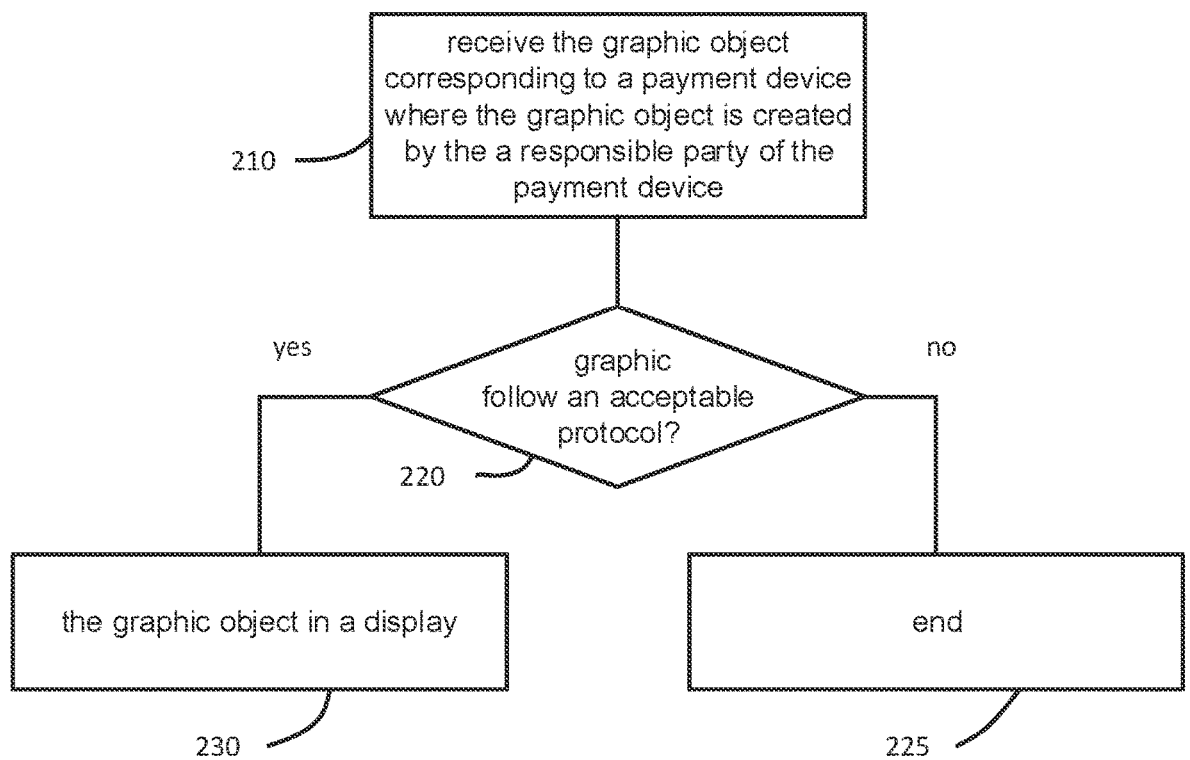
FIG. 2 illustrates a sample flow of computing blocks that may be executed by the system.

Referring now to FIG. 2, a processor-implemented method for displaying a graphic object 680 on a payment device 600 is described. The graphic object 680 may take on a variety of forms and shapes. As the graphic object 680 may be created by the user, the graphic object 680 may only be limited by the imagination of the user. It may be noted that computer power, available memory and available codecs and libraries may limit the graphic object 680 in some embodiments.

Some illustrations and not limitations on the graphic object 680 may include text such as a description of the benefits of the payment device 600, a list items to be purchased, a credit limit on an account or events that are upcoming that may require purchases. The graphic object 680 also may be a graphic such as an image of an item to be purchased or a graphic to remind a user of the benefits of a card. In some embodiments, the graphic object 680 may be a photo, an animation, a bitmap, a drawing, a video or a sound recording.

Figure 3:
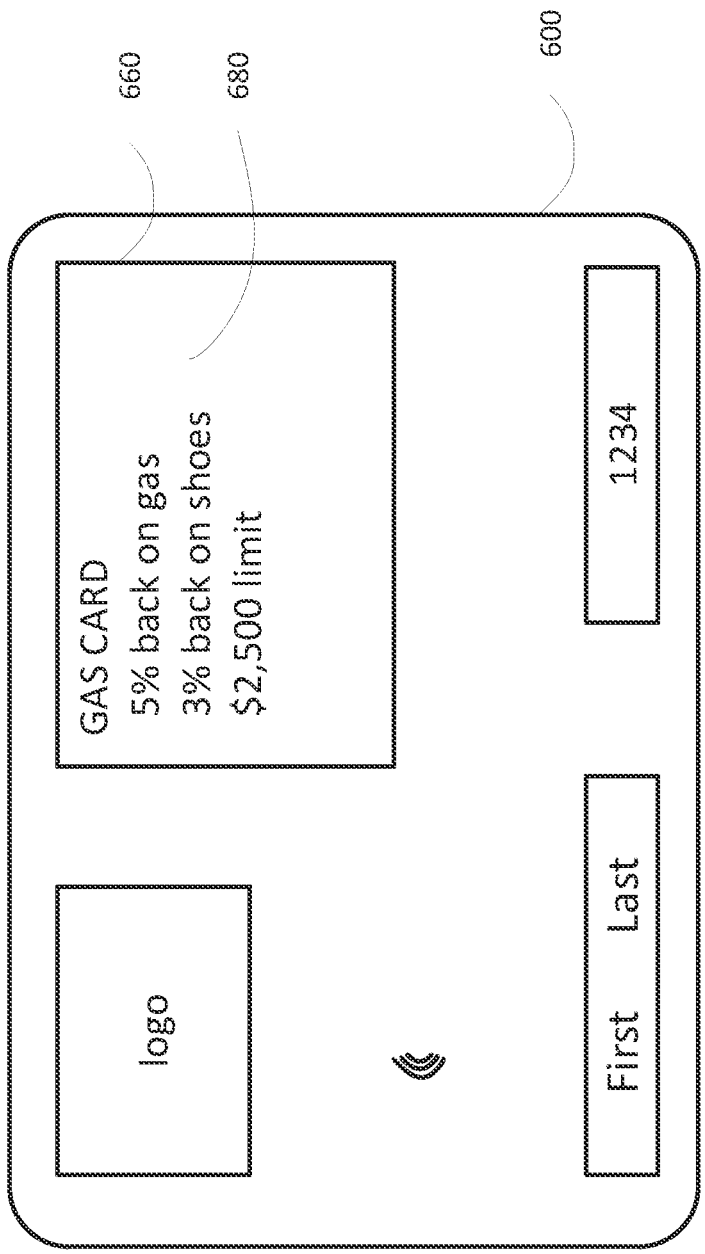
FIG. 3 illustrates a sample payment device with a display.
Figure 6:
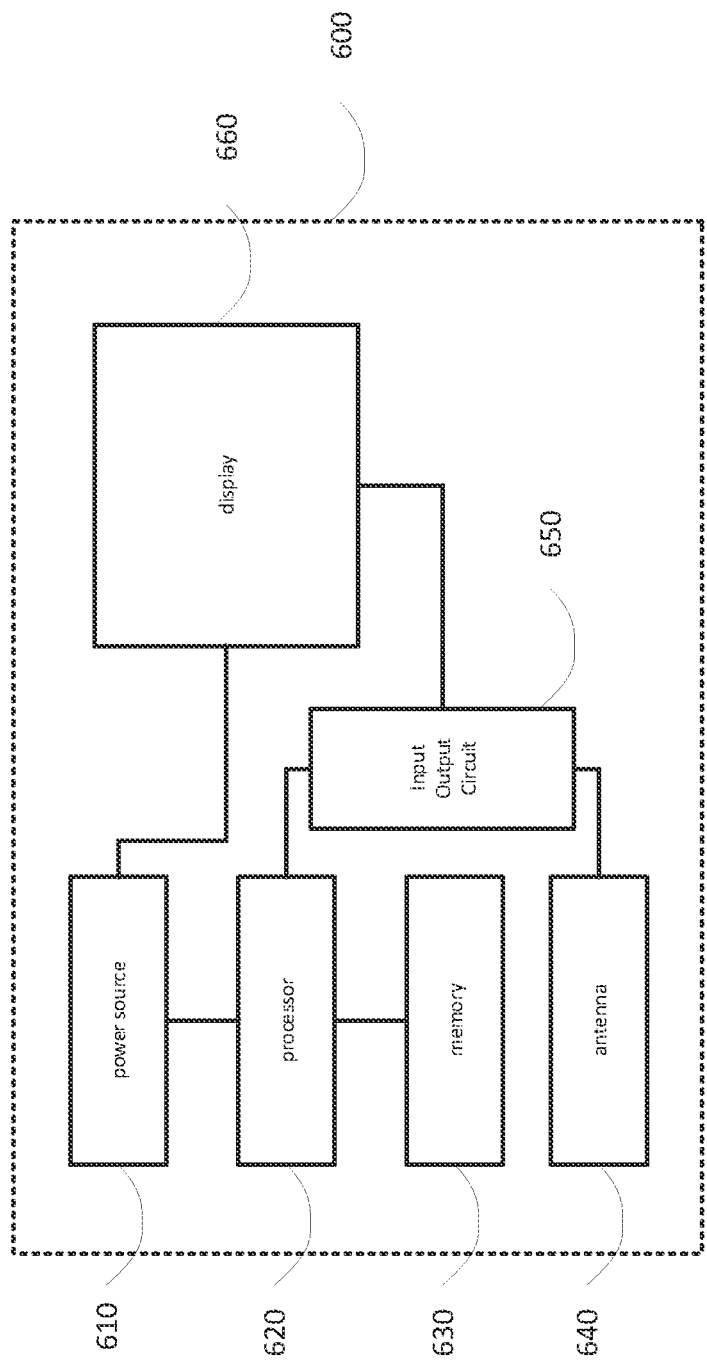
FIG. 6 illustrates sample-computing elements that make up the payment device.

The payment device 600 may take on a variety of forms. In one embodiment such as in FIG. 3, the payment device 600 may be a physical card. As illustrated in FIG. 6, a physical card may have a power source 610, a processor 620, a memory 630, an antenna 640 and input output circuit 650 and a display 660. The power source 610 may be a battery, a capacitor, a solar cell, a wireless power source that may be awoken when in range of a wireless power source or a combination of all of these power sources. The processor 620 may be a purpose built processor designed to minimize power use to conserve battery light. In addition, the graphics capabilities of the processor 620 may be adapted to work with the display 660 in the payment device 600 as the display 660 may purpose built also.

Referring again to the display 660 when part of a physical payment card 600, the display 660 may be designed to satisfy unique criteria of a physical card 600. In some embodiments, the display 660 may be flexible to such that it will not break if the payment card 600 is flexed. In addition, the display 660 may be designed to minimize power usage as the power source 610 on the payment card 600 may have a limited amount of power. In addition, the size of the display 660 may be limited by the size of the physical card 600. Thus, the number of pixels in the display 660 may be reduced while still providing sufficient clarity to effectively communicate messages or images. OLED displays may be one sample display 660 that are flexible and have low power consumption. E-ink type displays 660 also may be appropriate. Of course, other types of displays 660 are possible and are contemplated.

Figure 4:
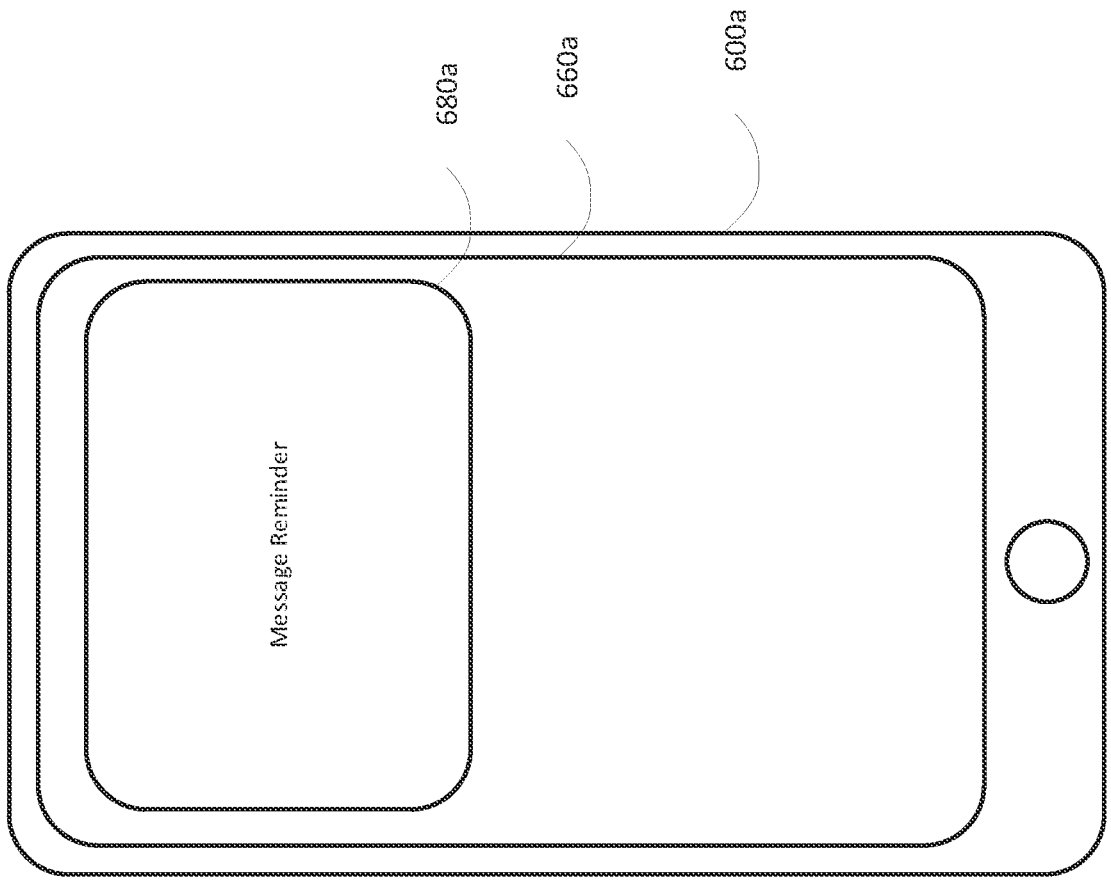
FIG. 4 illustrates a sample smart phone as a payment device with a display.

In another embodiment, the payment device 600 may be a mobile computer device 600*a*, such as a smart phone, that may be executing a mobile payment application such as illustrated in FIG. 4. Some sample payment applications or wallet applications may include Visa Checkout, ApplePay, Google Pay, Masterpay, etc. The application may have an application programming interface (API) to obtain the graphic 680*a* and display the graphic 680*a* as part of the payment application. As illustrated in FIG. 6, the mobile computing device, similar to the card embodiment of FIG. 3, may have a power source 610, a processor 620, a memory 630, an antenna 640 and input output circuit 650 and a display 660 as illustrated in FIG. 6. The processor 620 also may be designed to improve battery life and may be designed to improve the viewability of applications on the smaller display 660 of a mobile computing device or a tablet 600*a*.

Figure 5:
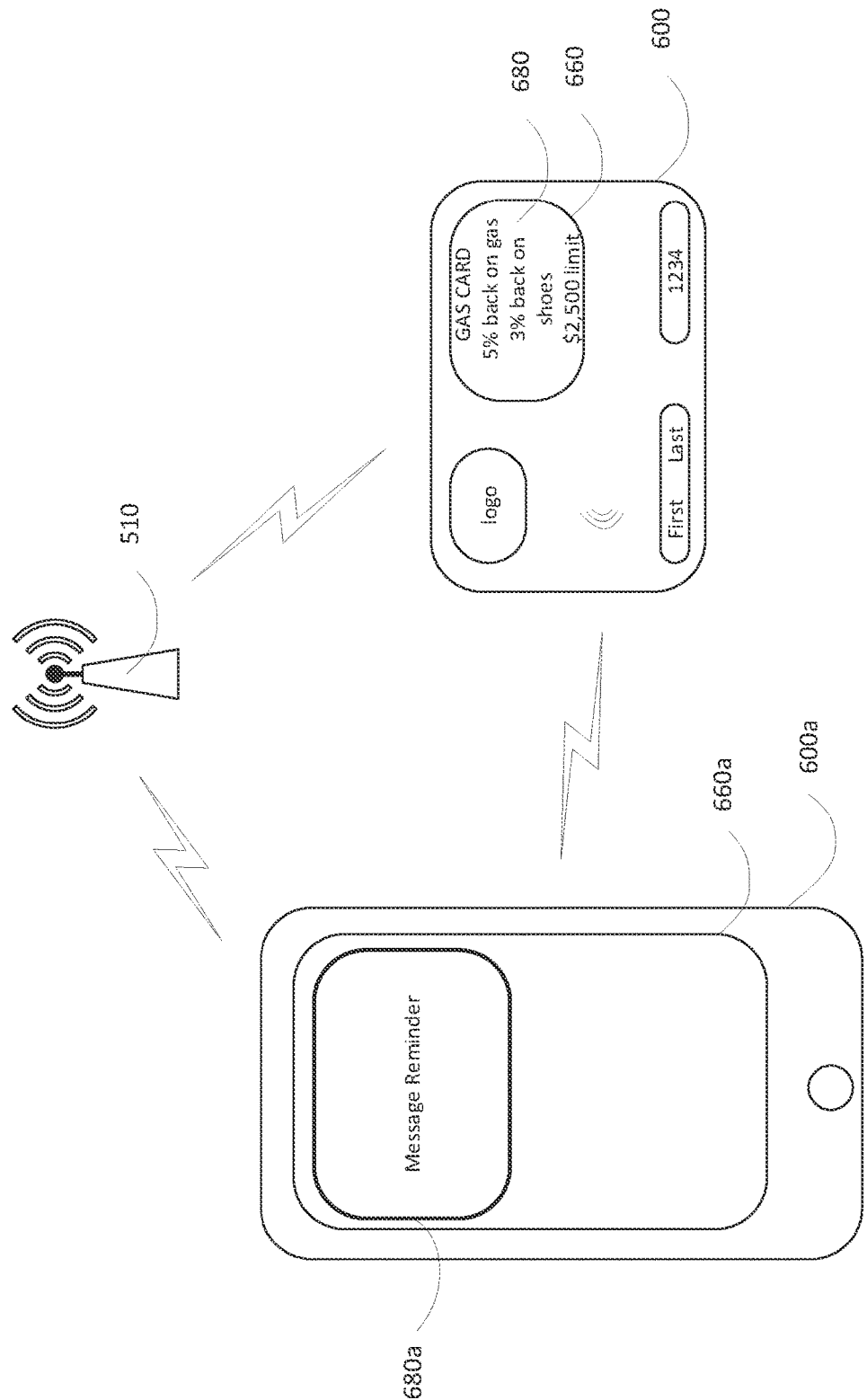
FIG. 5 illustrates payment devices communicating with a network.

In yet another embodiment such as illustrated in FIG. 5, the portable payment device 600 may be in the form of a traditional credit card and the credit card shaped device 600 may communicate with a portable communication device 600*a* such as a smart phone. In this way, the credit card shaped device 600 may use as NFC source to communicate with a nearby portable computing device 600*a* to receive the graphic.

In yet another embodiment, the portable payment device 600 may be close enough to a wireless access point 510 that either the card 600 or the mobile computing device 600*a* may be capable of communicating with traditional wireless signals 510. If appropriate log in credentials are available and security is sufficient, the payment device 600, 600*a* in any form may be able to communicate wirelessly through available networks to receive the graphics object 680.

Referring to FIG. 2, at block 210, a processor of a mobile computing device may receive the graphic object 680 680*a* corresponding to a payment device where the graphic object 680 680*a* is created by a responsible party of the payment device 600 600*a*. The graphic object 680 680*a* may be text or may be as complex as a video or animation depending on the capability of the payment device 600 600*a*.

The graphic object 680 680*a* may be created by an account holder or an agent or the account holder. The graphics object 680 680*a* may be as simple as a text message such as "5% back on fuel." Another example may be that an account holder may communicate a note saying "Careful—balance on October 31 is already at $2,300."

In another example, a list may be communicated as the graphic object 680 680*a*. The list may be a grocery list such as "Eggs, bacon, bread, milk." In yet another example, the list may be a reminder of things to purchase like "Ralph's birthday, Mom's anniversary, block party." In some embodiments, the display 660 660*a* may be capable of displaying color and the text in the graphic object 680 680*a* may be in different colors and the colors may have meaning specific to the user.

In some other embodiments, photos, animations, bitmaps, jpegs, videos may be the graphic object 680 680*a*. As mentioned previously, the graphic object 680 680*a* may be any object that is capable of being displayed on an electronic display 660 660*a* that is driven by a processor 620.

The graphic 680 680*a* may be created in a variety of ways. In one embodiment, an app may be used to create the graphic 680 680*a*. One possible app may be an electronic wallet app which may allow the graphic 680 680*a* to be created using a user interface designed for such a purpose. A specific section of the app may be dedicated to creating the graphic 680 680*a* such as a word processor type of interface where text may be typed and other objects may be dropped or loaded into the display such as an image, an animation or a video.

In another embodiment, the graphic 680 680*a* may be pulled from another app. For example, a user may keep a grocery list in a notes app and the grocery list may be pulled from the notes app to be communicated as the graphic 680 680*a*. In the graphic creation user interface, the user may be able to select to use a file as the graphic 680 680*a* or to connect with another app. As yet another example, a photo may be selected to be communicated to the payment device as a reminder and may be displayed on the payment device 600 600*a*. In another embodiment, apps may have the ability to push content to the payment app to be displayed as the graphic 680 680*a*. For example and not limitation, as a grocery list in a notes app changes, the grocery list may be updated on the payment device display 660 660*a*.

In yet another example, the graphic 680 680*a* may contain static elements and elements pulled from other applications. As an example and not a limitation, the text may include words like "current balance:" and the blank space may contain a reference to a separate program or network location. More specifically, a banking app may have an API set wherein a balance may be returned in response to a proper request. The text may use the banking API to obtain and display a current balance on the electronic account represented by the payment account. Similarly, an API request to a calendar may display notes or upcoming events.

At block 220, it may be determined if graphic 680 680*a* follows an acceptable protocol. Logically, the graphic 680 680*a* may be communicated according to a protocol to help with efficiency and security. The payment device 600 600a may expect the graphic 680 680a to follow an expected protocol. As an example and not limitation, a fraudulent message may not follow the protocol and the system and method may recognize that the graphic 680 680a should be rejected. If the graphic 680 680a is not in the expected protocol, the graphic 680 680a may be rejected by the payment device 600 600a at block 225. In some embodiments, a message may be returned that the graphic 680 680a was rejected. By following a protocol, the communication may also contain security elements. For example, the graphic 680 680a may be communicated using encryption or it may be enclosed in an electronic token.

A sample protocol may include an app identifier that may identify the app used to create the graphic, 680 680a a graphic type identifier that may identify the type of graphic 680 680a, a size field such that the receiver may understand the size of the message to be received, begin data indicating the start of the graphic data and end data that may identify the end of the graphic data.

In some embodiments, an application programming interface (API) may be used to obtain the graphic 680 680a. The graphic 680 680a may be stored remotely on a server and may be retrieved by communicating a request signal to a remote server and the server may respond with the graphic 680 680a. In this way, the graphic 680 680a may be continually updated and when it is retrieved from the remote server, it should be updated.

If the graphic 680 680a follows the expected format, the method may continue at block 230. At block 230, the processor of the mobile computing device 600 600a may display the graphic object 680 680a in a display area 660 660a. In some embodiments, the payment device 600 600a may be capable of rendering the data into an image 680 680a appropriate for the display 660 660a. In another embodiment, the payment device 600 600a may have limited processing power and the rendering may be accomplished on a remote computing device and the appropriate image 680 680a may be communicated in a form that is computationally easy to show on the display 660 660a.

The system and method may be triggered in a variety of ways. In one embodiment, the graphic object 680 may be displayed within a display 660 on the card based payment device 600 in response to receiving a selection of the payment device 600 within a threshold distance of the mobile computing device 600a executing a digital wallet application. For example, a user may have a smart phone 600a in a purse and the user may pull out a traditional payment card 600 and place it in proximity to a payment terminal. The payment terminal may have the ability to power the traditional payment card 600 either through the card 600 being in communication with the payment terminal or wireless power being communicated to the card 600 that may start the process.

In another embodiment, the graphic object 680 680a may displayed either on the card based payment device 600 or the portable computing device 600a when the portable computing device 600a receives a selection of a payment account for the payment device 600a at a digital wallet application executing at the mobile computing device 600a. Again, a user may take out a smart phone 600a, open a payment app, select a payment account and the graphic 680a may be displayed on the payment app. In addition, if the related physical payment card 600 is in the vicinity and is powered, it may also display the graphic 680.

In some embodiments, the graphic 680 680a may be payment account specific. In other embodiments, the graphic 680 680a may be more generic and may apply to all payment accounts. For example, a graphic 680 680a that contains a shopping list may apply to all payment accounts. However, a graphic 680 680a that a specific payment account may offer a specific discount may only be displayed when that specific payment account is selected.

The system 100 may include but is not limited to any combination of a LAN, a MAN, a WAN, a mobile, a wired or wireless network, a private network, or a virtual private network. Moreover, while only one remote computing device 104 is illustrated in FIG. 1 to simplify and clarify the description, it is understood that any number of client computers are supported and can be in communication within the system 100.

Additionally, certain embodiments are described herein as including logic or a number of components, modules, blocks, or mechanisms. Modules and method blocks may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a processor configured using software, the processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but also deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but also deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "embodiments," "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments for purposes of illustration only. One skilled in the art will readily recognize from the following discussion that alternative embodiments of the structures and methods illustrated herein may be employed without departing from the principles described herein.

The technological problem of how to recall which payment account offers which benefits is addressed by adding the ability to display a graphic created by the user on the payment device 600 600a. In the past, a payment device 600 600a may display a card issuer or other identification but the messages came from the issuer. Using the present system and method, a graphic 680 may be created by a user to be displayed on a display 660 660a on the payment device 600 600a at the time of purchase such that a message 680 680 a may be communicated to the user at the time of purchase. Payment devices 600 600a are physically modified to add a display 660 660a that is capable of displaying the graphic 680 680a.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A processor-implemented method for displaying a graphic object on a payment device, the method comprising:
   receiving, by a processor of a mobile computing device, a communication comprising a security element and the graphic object corresponding to a payment device, wherein the graphic object is created by a holder of the payment device;
   determining, using logic in the processor, whether the graphic object is in an acceptable protocol; and
   in response to determining that the graphic object is in the acceptable protocol, displaying, by the processor of the mobile computing device, the graphic object in a display area,
   wherein displaying the graphic object includes displaying the graphic object within a display on the payment device in response to receiving a selection of the payment device and the payment device being within a threshold distance of the mobile computing device executing a digital wallet application.

2. The processor-implemented method of claim 1 wherein the graphic object comprises text.

3. The processor-implemented method of claim 1 wherein the graphic object is formatted according to a protocol.

4. The processor-implemented method of claim 1, wherein the graphic object is received in response to a communication to an API.

5. The processor-implemented method of claim 1, wherein an application on a mobile computing device creates the graphic object.

6. The processor-implemented method of claim 5, wherein the application is in communication with other applications on the mobile computing device.

7. The processor-implemented method of claim 6, wherein the graphic object comprises data from other applications on the mobile computing device.

8. The processor-implemented method of claim 7, wherein the application pulls data from other applications to create the graphic object.

9. The processor-implemented method of claim 2, wherein receiving the graphic object includes receiving the graphic object from input of a digital wallet application at the mobile computing device.

10. The processor-implemented method of claim 1, wherein displaying the graphic object includes displaying the graphic object in response to receiving selection of a payment account for the payment device at a digital wallet application executing at the mobile computing device.

11. The processor-implemented method of claim 1, wherein a display is integral to a portable payment device.

12. The processor-implemented method of claim 11 wherein the graphic object is communicated to the portable payment device using wireless communication.

13. A portable computer payment system comprising a processor, a memory, a display, and an input output circuit, the processor being physically configured for:
   receiving, by the processor of the portable computer payment system, a communication comprising a security element and a graphic object corresponding to a payment device wherein the graphic object is created by a holder of the payment device;
   determining using logic on the processor whether the graphic object is in an acceptable protocol; and
   in response to determining that the graphic object is in the acceptable protocol, displaying, by the processor of the portable computer payment system, the graphic object in a display area,
   wherein displaying the graphic object includes displaying the graphic object within a display on the payment device in response to receiving a selection of the payment device and the payment device being within a threshold distance of the portable computer payment system executing a digital wallet application.

14. The computer payment system of claim 13, wherein the graphic object comprises at least one of: text, graphics or videos.

15. The computer payment system of claim 13, wherein the graphic object is formatted according to a protocol.

16. The computer payment system of claim 13, wherein an application on a mobile computing device creates the graphic object.

17. The computer payment system of claim 16, wherein the application is in communication with other applications on the portable computer payment system.

18. The computer payment system of claim 16, wherein the application pulls data from other applications to create the graphic object.

* * * * *